United States Patent
Ruud et al.

(10) Patent No.: US 7,691,770 B2
(45) Date of Patent: Apr. 6, 2010

(54) ELECTRODE STRUCTURE AND METHODS OF MAKING SAME

(75) Inventors: James Anthony Ruud, Delmar, NY (US); Kenneth Walter Browall, Saratoga Springs, NY (US); Timothy Joseph Rehg, Huntington Beach, CA (US); Stephane Renou, Clifton Park, NY (US); Todd-Michael Striker, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 1251 days.

(21) Appl. No.: 11/218,651

(22) Filed: Sep. 2, 2005

(65) Prior Publication Data

US 2007/0054798 A1    Mar. 8, 2007

(51) Int. Cl.
    *H01M 4/88*    (2006.01)
    *H01M 4/00*    (2006.01)
(52) U.S. Cl. .................. 502/101; 427/115; 429/44
(58) Field of Classification Search ............... 429/44; 502/101; 427/115
    See application file for complete search history.

(56) References Cited

U.S. PATENT DOCUMENTS

| 5,543,239 | A | 8/1996 | Virkar et al. ............... 429/33 |
| 6,815,391 | B2* | 11/2004 | Xing et al. ............... 502/184 |
| 2004/0023795 | A1* | 2/2004 | Christian et al. ............ 502/180 |
| 2006/0029860 | A1* | 2/2006 | Ketcham et al. ............ 429/209 |
| 2006/0234855 | A1* | 10/2006 | Gorte et al. ................. 502/101 |

OTHER PUBLICATIONS

Steve Simner, Mike Anderson, Gordon Xia, Gary Yang, and Jeff Stevenson "PNNL Cathode Development—SECA CTP Review", U.S. Department of Energy Pacific Northwest National Laboratory, Jan. 28, 2005, pp. (1-23).

V.A.C. Haanappel et al., "The influence of noble-metal-containing cathodes on the electrochemical performance of anode-supported SOFCs", Journal of Power Sources 130 (2004), pp. 119-128. (Available online at www.sciencedirect.com ).

* cited by examiner

*Primary Examiner*—Patrick Ryan
*Assistant Examiner*—Muhammad Siddiquee
(74) *Attorney, Agent, or Firm*—Paul J. DiConza

(57) ABSTRACT

A method of making an electrode structure is provided. The method includes disposing an electrocatalytic material on an electrode, applying heat to the electrocatalytic material to form a volatile oxide of the electrocatalytic material, and applying a voltage to the electrode to reduce the volatile oxide to provide a number of nano-sized electrocatalytic particles on or proximate to a triple phase boundary, where the number of nano-sized electrocatalytic particles is greater on or proximate to the triple phase boundary than in an area that is not on or proximate to the triple phase boundary, and where the triple phase boundary is disposed on the electrode.

10 Claims, 3 Drawing Sheets

ELECTRODE STRUCTURE AND METHODS OF MAKING SAME

This invention was made with Government support under contract number DE-FC26-01NT41245 awarded by Department of Energy. The Government has certain rights in the invention.

BACKGROUND

The invention relates generally to electrochemical devices having improved performance. In particular, the invention relates to electrode structures employed in the electrochemical devices and methods of making the same.

A solid oxide fuel cell (SOFC) is an electrochemical device that converts chemical energy of a fuel (such as hydrogen) and an oxidizer (such as air or oxygen) into electricity. In principle, the SOFC works like a battery, however, unlike a battery, the SOFC does not run down or require recharging. This is one of the reasons that solid oxide fuel cells (SOFCs) are considered as a viable option for clean and effective power generation.

As will be appreciated, a SOFC produces electricity by catalyzing fuel and oxidant into ionized atomic hydrogen and oxygen at the anode and cathode, respectively. The electrons removed from hydrogen in the ionization process at the anode are conducted to the cathode where they ionize the oxygen. This reaction takes place at triple phase boundaries formed between the cathode material, electrolyte and gas. Subsequently, the oxygen ions are conducted through the electrolyte where they combine with ionized hydrogen to form water as a waste product and complete the process. This series of electrochemical reactions provides the mechanism for generating electric power within the SOFC.

As will be appreciated, the efficiency of a SOFC is often limited by the efficiency of the electrodes in conducting this series of reactions. Disadvantageously, current materials for SOFC cathodes are limited by the rate of adsorption and dissociation of the oxygen molecules before they are incorporated in the solid oxide electrolyte at triple phase boundaries, thereby increasing the over-potential that limits the power output and the temperature at which the SOFC can operate.

Accordingly, it is desirable to have a material at the triple phase boundaries that accelerates the rate of reactions at the electrodes, such as oxygen adsorption and reduction at the cathode.

BRIEF DESCRIPTION

In accordance with one aspect of the present technique, a method of making an electrode structure is provided. The method includes disposing an electrocatalytic material on an electrode, applying heat to the electrocatalytic material to form a volatile oxide of the electrocatalytic material, and applying a voltage to the electrode to reduce the volatile oxide to provide a number of nano-sized electrocatalytic particles on or proximate to a triple phase boundary, where the number of nano-sized electrocatalytic particles is greater on or proximate to the triple phase boundary than in an area that is not on or proximate to the triple phase boundary, and where the triple phase boundary is disposed on the electrode.

In accordance with another aspect of the present technique, a method of making a solid oxide fuel cell is provided. The method includes applying an electrocatalytic material in a precursor form to a cathode, applying heat to the electrocatalytic material to convert the precursor form to a volatile oxide of the electrocatalytic material, and applying a voltage sufficient to convert the volatile oxide to a plurality of nano-sized electrocatalytic particles.

In accordance with yet another aspect of the present technique, an electrochemical device is provided. The device includes an electrode having a triple phase boundary disposed thereon, and a number of nano-sized electrocatalytic particles disposed on the electrode, where the number of nano-sized electrocatalytic particles is greater on or proximate to the triple phase boundary than in an area that is not on or proximate to the triple phase boundary.

In accordance with another aspect of the present technique, an electrode structure is provided. The electrode structure includes a ceramic cathode having a triple phase boundary disposed thereon, and a number of nano-sized electrocatalytic particles disposed on the electrode, where the number of nano-sized electrocatalytic particles is greater on or proximate to the triple phase boundary than in an area that is not on or proximate to the triple phase boundary.

In accordance with yet another aspect of the present technique, an electrochemical device is provided. The device includes an electrode having a triple phase boundary disposed thereon, and a number of nano-sized electrocatalytic particles disposed on the electrode, where the number of nano-sized electrocatalytic particles is greater on or proximate to the triple phase boundary than in an area that is not on or proximate to the triple phase boundary. The electrochemical device is formed by employing the methods described in the present technique.

DRAWINGS

These and other features, aspects, and advantages of the present invention will become better understood when the following detailed description is read with reference to the accompanying drawings in which like characters represent like parts throughout the drawings, wherein.

Figure 3:
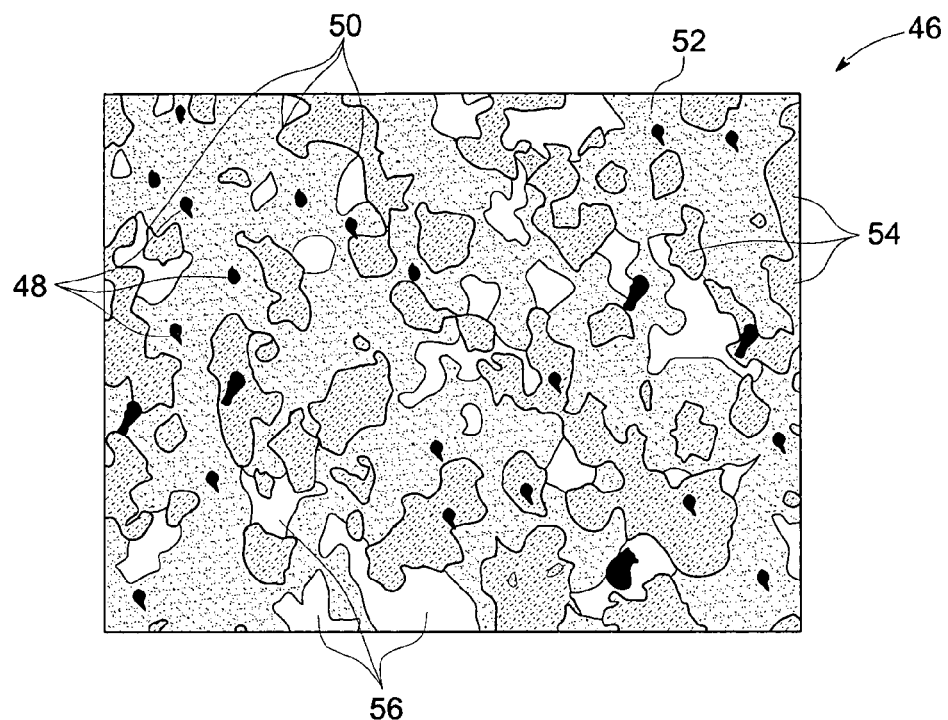
Figure 4:
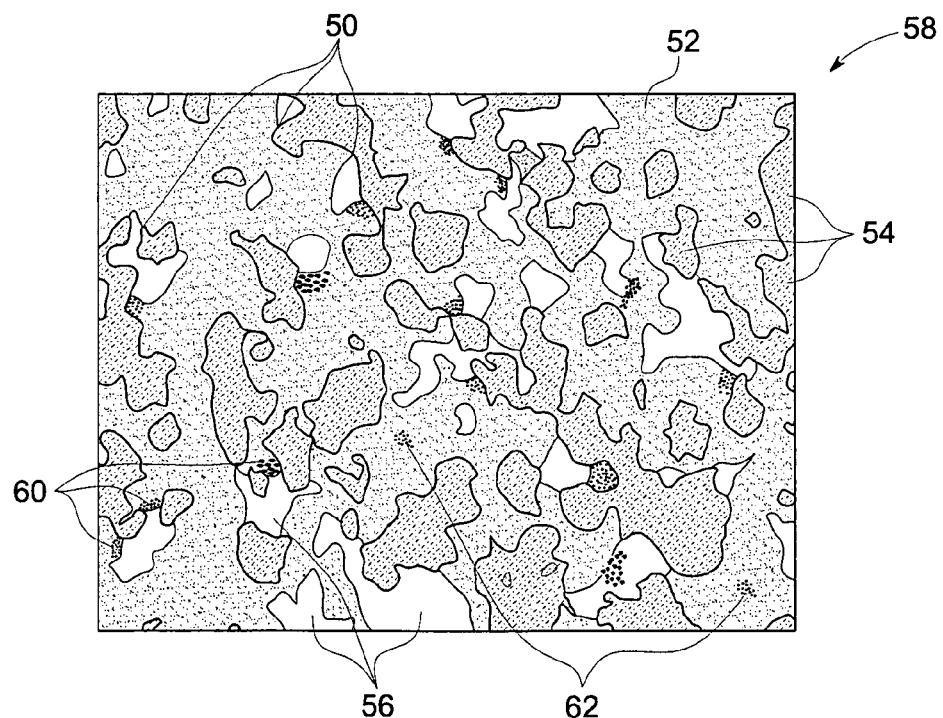

FIG. 3 is an illustration of the surface of an electrode having a plurality of electrocatalytic particles disposed thereon prior to the application of voltage, in accordance with certain embodiments of the present technique; and FIG. 4 is an illustration of the surface of an electrode having a plurality of nano-sized electrocatalytic particles disposed at triple phase boundaries, in accordance with certain embodiments of the present technique.

DETAILED DESCRIPTION

Figure 1:
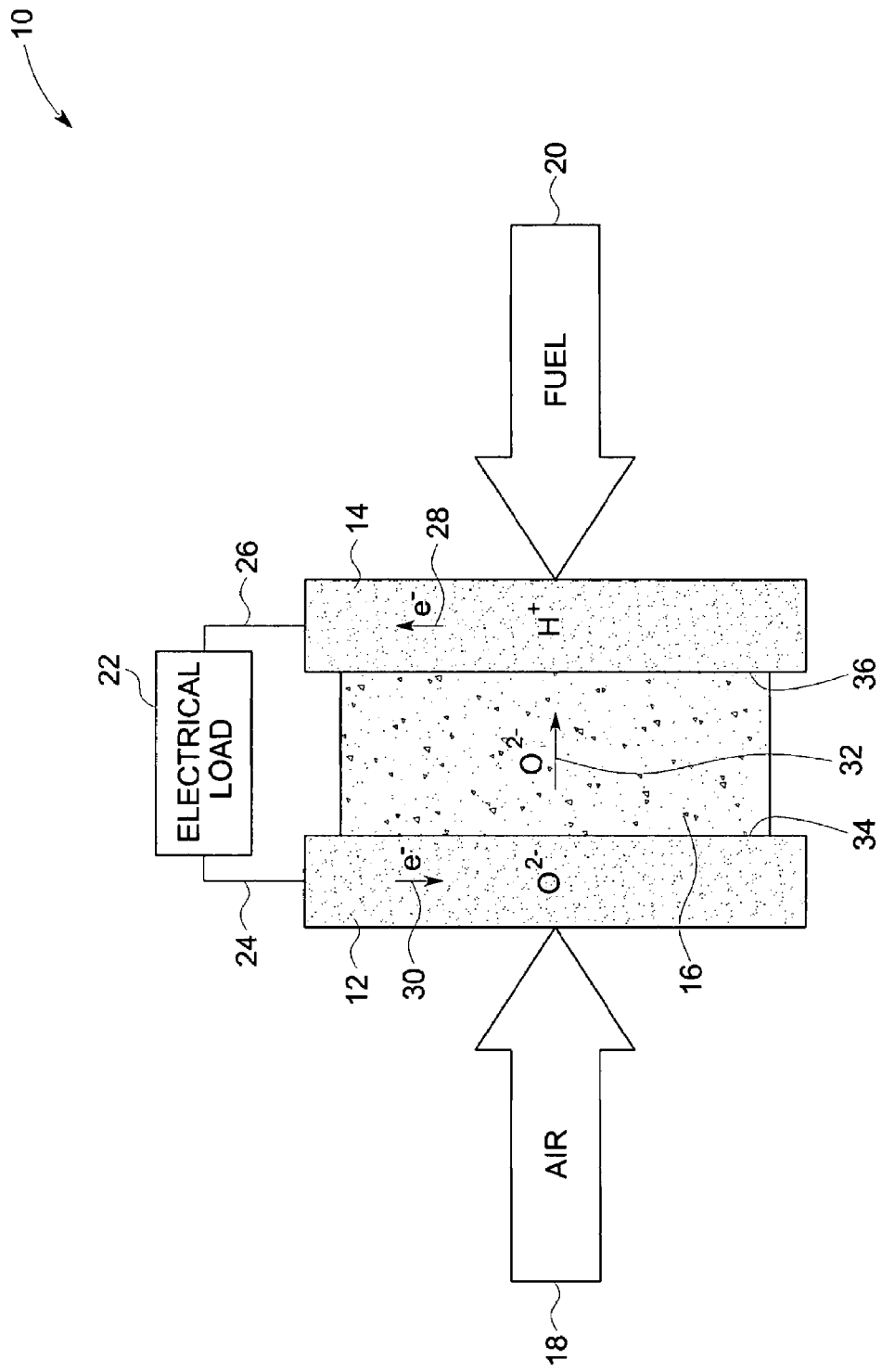
FIG. 1 is a cross-sectional side view illustrating an exemplary solid oxide fuel cell, in accordance with certain embodiments of the present technique.

Fuel cells, such as solid oxide fuel cells (SOFCs), have demonstrated a potential for high efficiency and low pollution in power generation. A SOFC is an energy conversion device that produces electricity, by electrochemically combining a fuel and an oxidant across an ionic conducting layer. FIG. 1 is a cross-sectional side view of an exemplary solid oxide fuel cell (SOFC) 10 having electrodes, such as a cathode 12 and an anode 14 and an electrolyte 16 interposed therebetween.

As discussed above, SOFCs, such as the SOFC 10, generate electricity by a series of chemical reactions at the electrodes 12 and 14. These reactions include electrochemical reactions in which an oxidizer, typically oxygen from air, and a fuel, typically hydrogen, combine to form a product for example, water. As will be appreciated, oxygen can be either supplied in pure form, or can be taken from air, which is more economical. In other words, in a SOFC 10, oxygen or air continuously passes over the cathode 12 (as shown by arrow 18) and fuel (such as hydrogen) passes over the anode 14 (as shown by arrow 20) to generate electricity with by-products like heat and water. In certain embodiments, hydrogen and its electrons are separated at the anode 14 to produce hydrogen ions (H$^+$). Subsequently, these electrons are conducted to the cathode 12 via an external electrical circuit 22 coupled between the electrodes 12 and 14 via electrical leads 24 and 26, where they ionize oxygen to form oxygen ions (O$^{2-}$). The conduction of the electrons from the anode 14 to the cathode 12 is represented by the electron path as shown by arrows 28 and 30. In an exemplary SOFC 10, the oxygen ions (O$^{2-}$) generated at the cathode 12 are transported across the electrolyte 16 (as shown by arrow 32) interposed between the cathode 12 and the anode 14 to react with hydrogen ions (H$^+$) to form water.

In an exemplary embodiment, at anode 14 the hydrogen from the fuel is oxidized to give hydrogen ion (H$^+$) and electrons. The reactions at anode 14 may be represented by:

$$H_2 \rightarrow 2H^+ + 2e^- \quad (1)$$

As discussed above, the electrons generated at anode 14 travel to the cathode and reduce oxygen gas to oxygen ions (O$^{2-}$), as shown below in equation (2):

$$O_2(gas) + 4e^- \rightarrow 2O^{2-} \quad (2)$$

These oxygen ions (O$^{2-}$) then travel through the electrolyte 16 and reach the anode 14 (as shown by arrow 32) to react with hydrogen ion (H$^+$) to form water as represented below in equation (3):

$$2H^+ + O^{2-} \rightarrow H_2O \quad (3)$$

As will be appreciated, the electrolyte 16 that separates the cathode 12 and the anode 14 includes an ionic conductor material. In some embodiments, the electrolyte 16 may be a solid electrolyte, such as yttria-stabilized zirconia (YSZ). In other embodiments, the electrolyte may employ some oxides, such as doped ceria due to its high ionic conductivity. In certain embodiments, anode and cathode layers may be deposited on the electrolyte 16. In these embodiments, the thickness of the electrolyte may vary from about 2 microns to about 200 microns and the thickness of the electrode layers 12 and 14 may vary from about 2 microns to about 1000 microns. In certain embodiments, the anode 14 and cathode 12 materials may include porous ceramic material. In some embodiments, the cathode 12 may include ceramic materials, such as lanthanum strontium magnetite, or yttria stabilized zirconia, or both. In some embodiments, the anode 14 may include a composite of metallic and ceramic materials, such as nickel and yttria stabilized zirconia. Additionally, in some embodiments, the anode 14 may include a two part structure having a first part and a second part, where the first part acts as an active anode where the cell reactions take place, and the second part acts as a support structure for the first part and provides mechanical support to the active anode. In these embodiments, the first part (or the active anode) comprises a relatively less porous surface, i.e., a higher surface area material, whereas the second part (or the support anode) comprises a more porous material and is typically thicker than the first part to provide mechanical strength to the anode structure.

As will be appreciated, an interface between an electrode, an electrolyte and a gas in the SOFC is known as a triple phase boundary (TPB) as will be described below with regard to FIGS. 3 and 4. In certain embodiments, at a TPB the electronic conductor, ionic conductor, and pore interact. That is to say, at a TPB the electrons contributed by the electrode, the ions contributed by the electrolyte and the gas species interact. Typically, in the SOFC 10, the cell reactions, such as the reactions shown in equations (1) and (2), take place at triple phase boundaries. Typically, in an ideal SOFC 10 structure, there are many active TPBs percolating into the porous electrode structure away from the interfaces 34 and 36 (FIG. 1) formed between the electrolyte 16 and the cathode 12 and anode 14, respectively.

As will be appreciated, the principal losses in most solid-state electrochemical devices occur in the electrodes and/or at the electrode/electrolyte interfaces. Minimization of these losses is central to obtaining high current and power densities in the SOFC 10. Further, SOFC electrodes comprising nano-structured electronic and ionic conductors greatly extend the TPB, thereby lowering polarization (i.e. a higher cell voltage at a given current density). As will be appreciated, lower polarization and higher ionic conductivity leads to increased efficiency. Additionally, lower polarization and higher ionic conductivity provide the ability for oxygen sensors and fuel cells to operate at lower temperatures than current systems. Further, as will be appreciated, lower operating temperatures reduce system cost and complexity while also increasing system reliability and design flexibility.

Accordingly, to facilitate the electrode reactions and thus to increase the electrochemical performance of the solid oxide fuel cell 10, a catalyst may be added to the cathode 12, or anode 14, or both. In certain embodiments, the catalyst includes nano-sized metal particles, which are disposed on or proximate to the TPBs. As used herein, the term "proximate" refers to the distance of the electrocatalytic particle from the nearest TPB that allows the electrocatalytic particles to take part in the reactions at the TPBs. In certain embodiments, these nano-sized electrocatalytic particles disposed on the triple phase boundaries speed the reaction at one or both the electrodes. For example, in certain embodiments, the nano-sized electrocatalytic particles may be disposed at the TPBs to enhance the catalytic activity of the cathode for oxygen adsorption and reduction into oxygen ions (O$^{2-}$). In an exemplary embodiment, the power density of the SOFC 10 employing nano-sized electrocatalytic particles is greater than about 1 W/cm$^2$ at 800° C. In certain embodiments, the catalyst may include platinum, palladium, rhodium, rhenium, ruthenium, silver, or combinations thereof.

Figure 2:
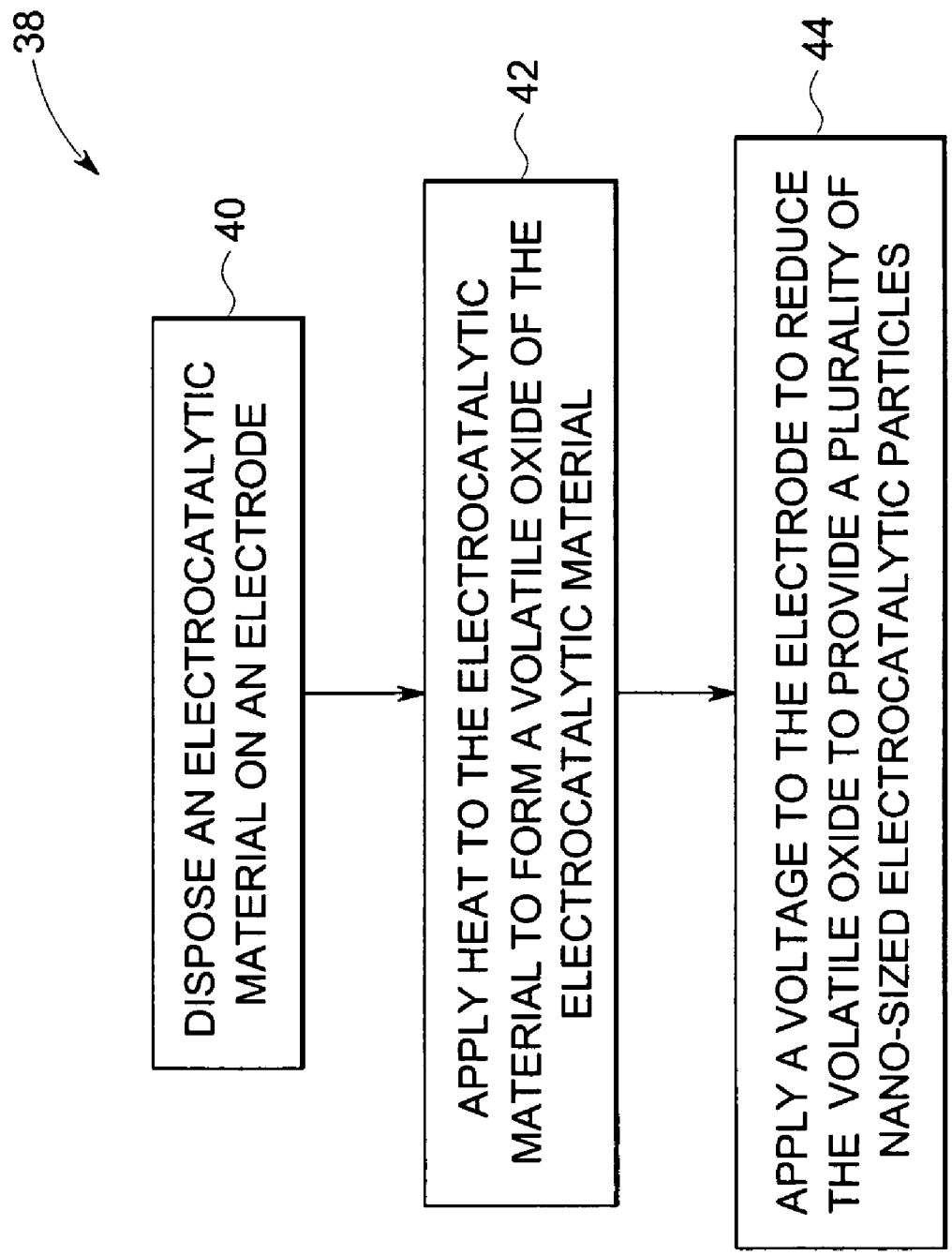
FIG. 2 is a flow chart illustrating an exemplary method of manufacturing an electrode structure, in accordance with certain embodiments of the present technique.

FIG. 2 is a flow chart illustrating an exemplary process 38 or a method of manufacturing an electrode structure, such as cathode 12, in accordance with certain embodiments of the present technique. At block 40, an electrocatalytic material is disposed on the electrode. The electrocatalytic material may be disposed either in a precursor form or in the form of a pure metal. For example, in certain embodiments, the step of disposing the electrocatalytic material on the electrode includes disposing a metal precursor on the electrode. In some embodiments, the metal precursor may include an organometallic compound, a metal salt, a paste of metal particles, a thin film, a bulk metal, or combinations thereof. For example, in the case of platinum, the metal precursor may include platinum, platinum chloride, potassium amminetrichloroplatinate, tetraammineplatinum chloride hydrate, diamminedinitritoplatinum, potassium tetracyanoplatinate hydrate, sodium tetrachloroplatinate hydrate, bis(acetylacetonato)platinum, cis-diamminediiodoplatinum, ammonium hexachloroplatinate, potassium hexachloroplatinate, dihydrogen hexachloroplatinate, tetraammineplatinum chloride, platinum nitrate, tetrammineplatinum nitrate, dihydrogen hexachloroplatinate hydrate, tetrammineplatinum hydroxide, dihydrogen hexahydroxoplatinate, tetraammineplatinum hydrogen carbonate or tetraammineplatinum hydrogen phosphate, or mixtures thereof. In an exemplary embodiment, metal particles of the electrocatalytic material may be deposited employing techniques such as, sputtering, evaporation, cathodic arc deposition, plasma spray, and chemical vapor deposition.

In other embodiments, the step of disposing the electrocatalytic material on the electrode comprises disposing a plurality of particles through chemical infiltration, the plurality of particles comprising an electrocatalytic material. In these embodiments, the particles infiltrated by chemical infiltration are of nano-size and are dispersed throughout the surface of the electrode. In some embodiments, the step of disposing the electrocatalytic material includes disposing a bulk metal source proximate to the electrode, where the bulk metal source includes the electrocatalytic material. In some embodiments, the bulk metal source comprises a wire, a grid, a perforated plate, a thin foil, or combinations thereof.

Next, at block 42, the electrocatalytic material disposed on the electrode is subjected to heat treatment to oxidize the electrocatalytic material and form a volatile oxide of the electrocatalytic material. In certain embodiments, the step of applying heat comprises heating the electrocatalytic material to a temperature ranging from about 400° C. to about 1000° C. In other embodiments, the step of applying heat comprises heating the electrocatalytic material to a temperature ranging from about 600° C. to about 900° C. In an exemplary embodiment, the heat is applied by placing the SOFC in a furnace.

Subsequently, at block 44, a voltage is applied to the electrode to reduce the volatile oxide into pure metal, as nano-sized electrocatalytic particles, which are deposited on the triple boundaries of the electrode. That is to say, upon application of voltage, the volatile oxide, which is present in the vapor phase on the electrode surface, reduces and re-deposits on the surface of the electrode in the form of nano-sized electrocatalytic particles. In certain embodiments, a majority of these nano-sized electrocatalytic particles are deposited on or proximate to the TPB present on the surface of the electrode under the influence of the applied voltage. In certain embodiments, the plurality of nano-sized electrocatalytic particles has a size in a range from about 100 nm to about 750 nm. In some embodiments, the plurality of nano-sized electrocatalytic particles may be disposed at a distance from the triple phase boundary but still act as active sites, i.e., these particles still participate in facilitating the reactions at the electrodes. In an exemplary embodiment, the distance of these particles as measured from their closest edge to the nearest TPB 42 is less than the largest dimension of that particle. For example, a particle having a largest dimension of 200 nm is disposed within a distance of 200 nm as measured from the closest edge of the particle to the nearest TPB 42.

In certain embodiments, the voltage applied to the electrode is in a range from about 0.1 V to about 1 V, and preferably in a range from about 0.05 V to about 0.5 V. In some embodiments, the electrode is maintained at a predetermined temperature while applying the voltage. In these embodiments, maintaining the predetermined temperature of the electrode facilitates the motion of electrocatalytic particles towards the TPBs under the influence of voltage. In some embodiments, the predetermined temperature is in a range from about 400° C. to about 1000° C., and preferably in a range from about 600° C. to about 900° C. As will be appreciated, the temperatures applied during the processing of the electrode are less than the melting temperature of the electrocatalytic material employed.

FIG. 3 is an illustration of the surface 46 of an electrode, such as cathode 12, having a plurality of electrocatalytic particles 48 prior to the application of voltage. In the illustrated embodiment, the TPBs 50 are formed between the electrode material, such as lanthanum strontium magnetite (LSM) 52, the electrolyte, such as yttria stabilized zirconia (YSZ) 54 and pore 56. As illustrated, prior to the application of voltage, the particles 48 are randomly located on the surface 48 of the electrode 12. In accordance with the present techniques, and as illustrated in FIG. 4, the particles 48 are subsequently converted to nano-size and dispersed at the TPBs 50 by employing processes as described with regard to FIG. 2.

Turning now to FIG. 4, a plurality of nano-sized electrocatalytic particles 60 are disposed on the surface 58 of the electrode and are either disposed on or proximate to the triple phase boundaries 50. In certain embodiments, the number of nano-sized electrocatalytic particles 60 is greater on or proximate to the TPB 50 as compared to the number of particles 62 which are in an area that is not on or proximate to the TPB 50. In some embodiments, the nano-sized electrocatalytic particles 60 are employed on the surface 58 of the cathode 12 to facilitate oxygen adsorption and reduction, and to enhance electronic conduction to allow easy migration of reduced oxygen ions ($O^{2-}$). Further, two different kinds of pathways are provided to these TPB's 50: 1) an ionic pathway, which is typically through the electrolyte 16 (see FIG. 1); and 2) an electronic pathway, which is typically through an electrically conductive support, such as electrocatalyst.

EXAMPLES

Three SOFCs having sample numbers Cell 245, Cell 249 and Cell 206, were fabricated and tested to demonstrate some of the advantageous properties of embodiments of the present techniques. Each of the three cells employed a nickel oxide-yttria-stabilized-zirconia (NiO—YSZ) anode, which included two parts. The first part was a support anode layer having a thickness of about 300 microns with high porosity, and the second part was an active anode layer having a thickness of about 30 microns with high surface area. Further, the SOFCs Cell 245, Cell 249 and Cell 206 had a YSZ electrolyte layer with a thickness of about 7 microns. The cathode employed in the samples Cell 245, Cell 249 and Cell 206 was made of a composite of LSM and YSZ. The LSM/YSZ composite had a thickness of about 40 microns. The structure of the Cells 245, 249 and 206 included dense YSZ electrolyte at the bottom with porous LSM and YSZ composite cathode disposed on top of the electrolyte.

Further, the current collector on the anode side was a platinum mesh embedded in a platinum paste. The power density at 800° C. at 0.7V was measured with flowing air on the cathode side and 3% $H_2O/H_2$ fuel flowing on the anode side. The power density was measured at the start of the test, after 3 hours of operation, and after 10 hours of operation under constant voltage. Cell 245 had a layer of platinum applied to the cathode on top of which was a platinum mesh current collector embedded in a 50 micron LSM layer, and it was run at 0.7V for 10 hours. Cell 249 had a layer of platinum applied to the cathode on top of which was a platinum mesh current collector embedded in a 50 micron LSM layer, and it was run at 0.6 V for 10 hours. In both the Cells 245 and 249, the platinum particles were chemically infiltrated during the fabrication process. The platinum layer was fabricated by disposing a layer of a platinum precursor solution (Pt Bright 05X, Engelhard, East Newark, N.J., USA) onto the surface of the cathode and firing at 900° C. for about 0.5 hours. Cell 206 had no platinum layer and used a gold mesh current collector embedded in a 50 micron LSM layer on the cathode side and was run at 0.7V for 10 hours.

Power densities of the three cells are given in the Table below. At the start of the test, the power densities of the three cells were approximately same. After the application of a potential for 3 hours, Cell 245 and Cell 249 showed over a 100% increase. However, a relatively lesser increase was observed in the power densities of the Cells 245 and 249 in the remaining 7 hours. On the other hand, the power density of Cell 206 improved by only 35% in the 10 hours, with very little progress observed in the first 3 hours. The increase in power density of the Cells 245 and 249 was attributed to a redistribution of the platinum particles under the influence of the applied potential. Platinum particles were redistributed not only to the region near the electrolyte interface but also preferentially to triple point boundaries near the conjunction LSM cathode, YSZ electrolyte and the pores. The redistribution of the particles resulted in an increase in the power density. High magnification micrographs of the cathode to which platinum had been applied illustrated dispersed particles on the cathode surface, such that the majority of the particles were disposed on or proximate the TPBs of the cathode, electrolyte and pore. The size of the platinum particles was between about 100 nm to about 750 nm.

TABLE

| Power density (W/cm$^2$) | 0 hours | 3 hours | 10 hours |
|---|---|---|---|
| Cell 245 | 0.43 | 0.98 | 1.01 |
| Cell 249 | 0.51 | 1.11 | 1.15 |
| Cell 206 | 0.39 | 0.44 | 0.53 |

Although the present technique is discussed with reference to SOFC, the nano-sized electrocatalytic particles prepared by the present technique may also be employed in other applications like, solid-state batteries, sensors, membranes for gas separation, and electro-chromic devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of making an electrode structure, comprising:
   disposing an electrocatalytic material on an electrode;
   oxidizing the electrocatalytic material to form a volatile oxide by applying heat to the electrocatalytic material; and
   electrochemically reducing the volatile oxide by applying a voltage to the electrode to provide a number of nano-sized electrocatalytic particles on or proximate to a triple phase boundary, wherein the number of nano-sized electrocatalytic particles is greater on or proximate to the triple phase boundary than in an area that is not on or proximate to the triple phase boundary, and wherein the triple phase boundary is disposed on the electrode.

2. The method of claim 1, wherein the step of disposing the electrocatalytic material on the electrode comprises:
   disposing a metal precursor on the electrode, wherein the metal precursor comprises the electrocatalytic material.

3. The method of claim 2, wherein the metal precursor comprises an organometallic compound, a metal salt, a paste of metal particles, a thin film, a bulk metal, or combinations thereof.

4. The method of claim 1, wherein the step of disposing the electrocatalytic material on the electrode comprises:
   disposing a bulk metal source proximate the electrode, the bulk metal source comprising the electrocatalytic material.

5. The method of claim 4, wherein the bulk metal source comprises a wire, a grid, a perforated plate, a thin foil, or combinations thereof.

6. The method of claim 1, wherein the step of disposing the electrocatalytic material on the electrode comprises:
   disposing a plurality of particles though chemical infiltration, the plurality of particles comprising electrocatalytic material.

7. The method of claim 1, wherein the step of forming a volatile oxide by applying heat comprises heating the electrocatalytic material to a temperature ranging from about 400° C. to about 1000° C.

8. The method of claim 1, wherein the voltage is in a range from about 0.1V to about 1V.

9. The method of claim 1, wherein the step of reducing the volatile oxide by applying the voltage comprises applying the voltage while maintaining a predetermined temperature of the electrode.

10. The method of claim 9, wherein the predetermined temperature is in a range from about 400° C. to about 1000° C.

* * * * *

UNITED STATES PATENT AND TRADEMARK OFFICE
CERTIFICATE OF CORRECTION

| | | |
|---|---|---|
| PATENT NO. | : 7,691,770 B2 | Page 1 of 1 |
| APPLICATION NO. | : 11/218651 | |
| DATED | : April 6, 2010 | |
| INVENTOR(S) | : Ruud et al. | |

It is certified that error appears in the above-identified patent and that said Letters Patent is hereby corrected as shown below:

In Column 1, Line 3, below Title, insert -- STATEMENT REGARDING FEDERALLY SPONSORED RESEARCH & DEVELOPMENT --.

In Column 8, Line 33, in Claim 6, delete "though" and insert -- through --, therefor.

Signed and Sealed this

Eighth Day of June, 2010

David J. Kappos
*Director of the United States Patent and Trademark Office*